United States Patent
Siegfriedsen

(10) Patent No.: US 7,029,576 B2
(45) Date of Patent: Apr. 18, 2006

(54) WIND ENERGY INSTALLATION COMPRISING A SEAWATER OR BRACKISH WATER DESALINATION PLANT

(75) Inventor: Sonke Siegfriedsen, Friedrichstadt (DE)

(73) Assignee: Aerodyn Engineering GmbH, Rendsburg (DE)

( * ) Notice: Subject to any disclaimer, the term of this patent is extended or adjusted under 35 U.S.C. 154(b) by 406 days.

(21) Appl. No.: 10/467,230

(22) PCT Filed: Jan. 28, 2002

(86) PCT No.: PCT/DE02/00278

§ 371 (c)(1),
(2), (4) Date: Aug. 6, 2003

(87) PCT Pub. No.: WO02/063165

PCT Pub. Date: Aug. 15, 2002

(65) Prior Publication Data

US 2004/0050760 A1    Mar. 18, 2004

(30) Foreign Application Priority Data

Feb. 6, 2001    (DE) .............................. 101 05 181

(51) Int. Cl.
*B01D 61/10* (2006.01)
*F03D 9/02* (2006.01)
*C02F 1/44* (2006.01)

(52) U.S. Cl. ................. 210/153; 210/170; 210/262; 210/321.6; 210/416.3; 290/55; 417/335

(58) Field of Classification Search ............... 210/101, 210/170, 321.66, 321.6, 416.3, 262, 153; 290/44, 45; 417/334, 335
See application file for complete search history.

(56) References Cited

U.S. PATENT DOCUMENTS

| | | | | |
|---|---|---|---|---|
| 4,187,173 | A | * | 2/1980 | Keefer .................. 210/652 |
| 5,052,902 | A | | 10/1991 | Labrador |
| 5,094,595 | A | | 3/1992 | Labrador |
| 5,507,943 | A | | 4/1996 | Labrador |
| 6,100,600 | A | | 8/2000 | Pflanz |
| 6,293,121 | B1 | | 9/2001 | Labrador |
| 6,327,994 | B1 | | 12/2001 | Labrador |
| 6,521,127 | B1 | * | 2/2003 | Chancellor ............ 210/321.72 |

FOREIGN PATENT DOCUMENTS

| | | | |
|---|---|---|---|
| DE | 3808536 A1 | * | 9/1989 |
| DE | 4321050 A1 | * | 1/1995 |
| DE | 19714512 C2 | * | 6/1999 |
| DE | 19850565 A1 | * | 5/2000 |
| DE | 20013613 U1 | * | 1/2001 |

* cited by examiner

Primary Examiner—Terry K. Cecil
(74) Attorney, Agent, or Firm—Larson & Larson, PA; Herbert W. Larson

(57) ABSTRACT

A wind energy installation having a tower, a gondola supported by the tower, a rotor mounted in the gondola, and at least one pressure pump that is mechanically driven by the rotor and that feeds a raw water-treating reverse osmosis plant, the components of the reverse osmosis plant being arranged within the tower.

15 Claims, 1 Drawing Sheet

WIND ENERGY INSTALLATION COMPRISING A SEAWATER OR BRACKISH WATER DESALINATION PLANT

PRIOR APPLICATIONS

This application bases priority on International Application No. PCT/DE02/00278, filed Jan. 28, 2002, which in turn bases priority on German Application No. DE 101 05 181.6, filed Feb. 6, 2001.

BACKGROUND OF THE INVENTION

1. Field of the Invention

This invention relates to a wind power plant having a tower, a gondola carried by the latter, a rotor mounted in the gondola and at least one pressure pump, feeding a reverse osmosis plant, and mechanically driven by the rotor.

2. Description of the Prior Art

Wind power plants used for generating electric power are known in numerous different constructions. In addition, sea water desalination plants are known which desalinate sea or brackish water, usually employing fossil energy sources. Also in the case of electrically operated plants working according to the reverse osmosis process, use is normally made of electric power generated using fossil fuels.

To permit the use of renewable energy sources, it has already been proposed to generate the electric power necessary for operating the pumps and other electrical units of a reverse osmosis plant by means of a wind power plant, e.g. U.S. Pat. No. 4,187,173, DE 200 13 613 U1, DE 197 14 512 C2, DE 198 50 565 A1, and DE 43 21 050 A1. It is clear that such an interconnection of conventional plants has a limited efficiency.

DE 38 08 536 A1 discloses a wind power plant in which the rotor acts by means of a miter gear on a set of pumps, which act on a pressure container located in the tower. This pressure container in turn supplies a reverse osmosis plant located outside the wind power plant.

The known plants have a complicated and costly construction. Therefore, the problem of the invention is to provide a wind power plant, which in the case of a simple construction, can desalinate with high efficiency sea or brackish water for the production of drinking water. This problem is solved by the novel invention disclosed herein.

SUMMARY OF THE INVENTION

The essence of the invention is to use most of the available kinematic energy of a wind power plant directly for driving pump units, which produce the necessary pressure and volume flow of the sea or brackish water for a reverse osmosis plant. All of the functional elements such as untreated water reservoir, filter unit, pump units, reserve osmosis units and drinking water storage tank, are integrated into the wind power plant. With such a construction, it is ensured that electric power generated by a generator is not converted back into mechanical energy. This type pf conversion chain means double efficiency losses and high costs for the necessary components and unit.

The energy of rotation of the wind power plant rotor is directly or indirectly via a gear transmitted to one or more pump units in the wind power plant gondola. These direct mechanically driven pumps are supplied from the base of the tower with the sea or brackish water to be desalinated and produce a speed-dependent volume flow. By means of a valve system, said sea or brackish water is supplied to the reverse osmosis unit.

As a function of the valve control and the number of reverse osmosis units, a pressure is built up in the system. The pressure and volume flow are controlled by means of a regulating device and adapted to the given operating conditions. A temporary storage battery ensures the brief compensation of load fluctuations in the system. By means of the regulating device, it is also possible to connect or disconnect via valves, optionally, several pump units and reverse osmosis units in order to use the given available rotor power.

The filter unit and reverse osmosis unit are preferably housed in the upper part of the tower and are supplied from above with pressure medium from the gondola. The filter and reverse osmosis units are preferably fixed in rotary manner to the gondola in a rotating frame, so that the pressure waterline can be firmly connected to the pump unit. Located there below is the drinking water tank which is firmly fitted in the tower; into it flows the drinking water from the reverse osmosis plant. Through the height of the head of water, a pressure is simultaneously produced in the drinking water removal pipe which permits a bridging of longer distances.

For the passage of the sea or brackish water supply pipe and for personnel access purposes, the drinking water tank is centrally provided with a duct. In the foundation part of the wind power plant is located a sea or brackish water reservoir with a pre-filter, a chlorination plant and a feed pump.

It is particularly advantageous if the wind power plant is constructed offshore and is installed directly in the sea or brackish water. The untreated water reservoir with the necessary components can be incorporated directly into the foundation part below the water level, and can be supplied directly with virtually unlimited sea or brackish water quantities. The continuously produced filter sludge and other waste concentrates can be returned directly to the sea or brackish water.

The entire functional unit is directly integrated into the offshore wind power plant. There is merely a need for a water pipeline on land to the customer. The necessary electrical auxiliary energy for secondary units is generated by a small generator.

BRIEF DESCRIPTION OF THE DRAWINGS

Further advantages and features of the invention can be gathered from the following description of a preferred embodiment of the invention with reference to the attached drawing, wherein.

DETAILED DESCRIPTION OF THE PREFERRED EMBODIMENT

Figure 1:
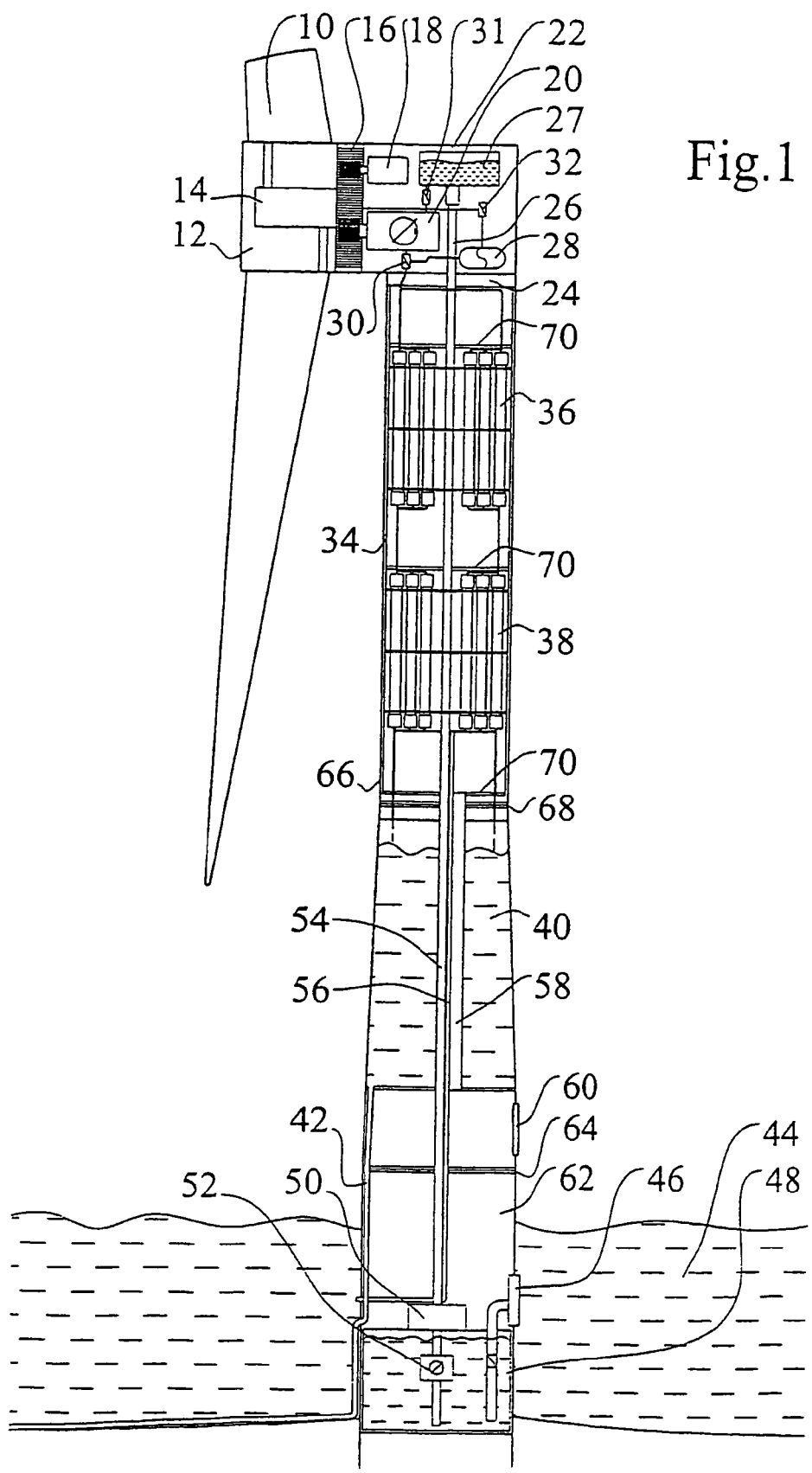
FIG. 1 shows a wind energy installation having a seawater or brackish water desalination wind power plant of the present invention.

The energy transformation of the wind power plant from translatory air movement to energy of rotation takes place by means of the rotor blades 10 which are pivotally mounted on the rotor hub 12, and whose setting angle can be modified by means of the blade adjustment 14. By means of the gear 16 which is driven on the rotor side by the hub 12, the speed of the driven shafts is raised to 1500 to 3000 $\text{min}^{-1}$. At the rapidly rotating driven shafts are driven, an auxiliary generator 18 and one or more pressure pumps 20. The electric power generated by the auxiliary generator 18 is temporarily stored by a battery supplying the regulating device.

These components are located in the gondola 22 of the wind power plant continuously oriented in accordance with the variable wind direction by means of the wind direction tracking system 24. By means of a rotary passage 26, the sea or brackish water 44 is fed into the storage tank 27 and supplied by means of valve 31 to the pressure pump 20 in the rotary gondola 22. The pressure pump 20 places under pressure the sea or brackish water supplied.

The pressure reservoir or tank 28 compensates load peaks, and therefore smooths the pressure distribution per time unit. By means of the regulating device 32 using the regulating valve 30, the volume flow of the pressurized sea or brackish water and via the blade adjustment 14, the output of the rotor are regulated so that they are matched to one another.

Below the gondola 22, the filter units 36 and reverse osmosis unit 38 are located in a jointly rotating frame 34. As a result of the suspension rotating with the gondola 22, the pressure pipes can be firmly connected between the pressure pumps 20 and the filter unit 36, as well as the reverse osmosis unit 38. The drinking water tank 40, which serves as a reservoir, is located below the reverse osmosis unit 38. As a result of the overall height of the tank above the ground, the static pressure can feed the water via the drinking water pipe 42 over long distances.

In the proposed solution, the wind power plant is installed directly at the sea or brackish water 44 so that the plant is surrounded on all sides by sea or brackish water 44. By means of an untreated water filter 46, the water passes into an untreated water reservoir 48 located below the water surface. By means of an electrolytic chlorination system 50, the water is chemically pre-treated. An electrically operated lifting pump 52 feeds the sea or brackish water 44 via the untreated water lifting pipe 54, the rotary passage 26, and the storage tank 27 to the pressure pump 20 in the gondola 22. Parallel to the untreated water lifting pipe 54 is located the waste water pipe 56 which returns the salt water concentrate and filter sludge from the filter unit 36 to the sea or brackish water 44. These pipes are arranged centrally to the outer pipe and are located in the climb-through pipe 58 within the drinking water tank 40. Said pipe 58 is also used for the ascent of personnel for maintenance or repair purposes, the lower tower part being reached through the entrance door 60.

The entire plant is connected by means of the foundation part 62 to the sea bed. The tower 66 is connected to the foundation part 62 by the bottom flange 64. The tower 66 comprises the lower tower segment with the drinking water tank 40, and the upper tower segment with the filter unit 36 and reverse osmosis unit 38. Both tower parts are interconnected by means of the connecting flange 68. For maintenance purposes on the filter unit 36 and reverse osmosis unit 38, the rotating frame 34 contains two maintenance platforms 70, in each case below the subassemblies.

Equivalent elements can be substituted for the ones set forth above such that they perform in the same manner in the same way for achieving the same result.

The invention claimed is:

1. A wind energy plant for the desalination of salt or brackish water for producing drinking water, the wind energy plant comprising:
    a) an elongated tower structure having a top and bottom portion;
    b) a gondola carried by the tower top portion;
    c) a rotor mounted in the gondola, the rotor including a set of blades and a hub on which the blades are mounted;
    d) a reverse osmosis plant located within the tower structure;
    e) at least one pressure pump feeding the reverse osmosis plant mechanically driven by the rotor; and
    (f) a pressure reservoir located between the at least one pressure pump and the reserve osmosis plant, wherein the pressure reservoir is located within the gondola.

2. The wind energy plant according to claim 1, wherein the at least one pressure pump is located within the gondola.

3. The wind energy plant according to claim 1, further comprising a gear operated by the rotor hub for driving the at least one pressure pump.

4. The wind energy plant according to claim 1, further comprising a rotating frame portion mounted generally at a mid-section of the elongated tower structure, the reverse osmosis plant mounted within the rotating frame portion.

5. The wind energy plant according to claim 1, wherein the salt or brackish water is introduced and held in a water reservoir located at a base section of the tower bottom portion.

6. The wind energy plant according to claim 1, further comprising a drinking water tank located in the tower bottom portion.

7. The wind energy plant according to claim 1, further comprising an auxiliary generator driven by the rotor hub.

8. The wind energy plant according to claim 1, wherein the reverse osmosis plant comprises a plurality of modular units removably connected by a regulating device.

9. The wind energy plant according to claim 1, wherein the elongated tower structure is erected in a body of sea water having a sea line such that a section of the tower bottom portion is located below the sea line.

10. The wind energy plant according to claim 9, further comprising:
    a) an access pipe located within the tower structure along an elongated axis thereof;
    b) a foundation part located within the tower bottom portion having a flange for supporting maintenance personnel within an area below the access pipe; and
    c) an entrance door connecting the area below the access pipe to an outside area of the tower structure.

11. A wind energy plant for the desalination of salt or brackish water for producing drinking water, the wind energy plant comprising:
    a) an elongated tower structure having a top and bottom portion and a rotating frame portion positioned between the tower top and bottom portion;
    b) a gondola carried by the tower top portion;
    c) a rotor mounted in the gondola, the rotor including a set of blades and a hub on which the blades are mounted;
    d) a gear mounted in the gondola and operated by the rotor hub;
    e) a reverse osmosis plant located within the tower structure rotating frame portion; and
    f) at least one pressure pump located within the gondola feeding the reverse osmosis plant mechanically driven by the gear.

12. The wind energy plant according to claim 11, further comprising:
    a) a pressure reservoir located within the gondola;
    b) a water reservoir located at a base section of the tower bottom portion;

c) a drinking water tank located in the tower bottom portion above the base section; and d) an auxiliary generator driven by the rotor hub located within the gondola.

13. The wind energy plant according to claim 11, wherein the reverse osmosis plant comprises a plurality of modular units removably connected by a regulating device.

14. The wind energy plant according to claim 11, wherein the elongated tower structure is erected in a body of sea water having a sea line such that a section of the tower bottom portion is located below the sea line.

15. The wind energy plant according to claim 14, further comprising:

a) an access pipe located within the tower structure along an elongated axis thereof;

b) a foundation part located within the tower bottom portion having a flange for supporting maintenance personnel within an area below the access pipe; and c) an entrance door connecting the area below the access pipe to an outside area of the tower structure.

* * * * *